United States Patent [19]
Handa et al.

[11] Patent Number: 5,955,511
[45] Date of Patent: Sep. 21, 1999

[54] MANUFACTURING ULTRAMICROCELLULAR POLYMER FOAMS AT LOW PRESSURE

[76] Inventors: Y. Paul Handa, 797 Lalande Terr., Orleans, Ontario, Canada, K4A 2M4; Zhiyi Zhang, 9-395 Carmen Street, Vanier, Ontario, Canada, K1L 6Y1

[21] Appl. No.: 09/144,115

[22] Filed: Aug. 31, 1998

[51] Int. Cl.[6] .................................................. C08J 9/00
[52] U.S. Cl. .............................. 521/97; 264/50; 521/98; 521/145; 521/146; 521/149; 521/182
[58] Field of Search ................................ 521/97, 98, 146, 521/149, 182, 145; 264/50

[56] References Cited

U.S. PATENT DOCUMENTS

| | | | |
|---|---|---|---|
| 4,473,665 | 9/1984 | Martini-Vvedensky et al. | 521/79 |
| 5,133,913 | 7/1992 | Miyakawa et al. | 528/483 |
| 5,160,674 | 11/1992 | Colton et al. | 264/50 |
| 5,684,055 | 11/1997 | Kumar et al. | 521/79 |

*Primary Examiner*—Morton Foelak
*Attorney, Agent, or Firm*—J. Wayne Anderson

[57] ABSTRACT

The invention disclosed provides a method for producing ultramicrocellular polymer foams at low pressures. A polymer is saturated with a blowing agent at low temperatures and pressures within a short time period, due to retrograde vitrification. The blowing agent may be in the form of a gas or a volatile liquid. Polymer-blowing agent combinations are selected to provide a processing temperature/pressure in the area below the positive slope portion of the retrograde vitrification profile of the glass transition temperature of the polymer versus pressure. The polymer thus saturated has an exceptionally high blowing agent content, and is then foamed to produce materials with small cells and high cell density.

20 Claims, 11 Drawing Sheets

MANUFACTURING ULTRAMICROCELLULAR POLYMER FOAMS AT LOW PRESSURE

FIELD OF THE INVENTION

The present invention relates to a method for producing microcellular polymer foams with small cells and high cell density.

BACKGROUND OF THE INVENTION

Articles made from microcellular polymeric-foams use less material and have same or better mechanical properties than the unfoamed polymer. The combination of small cell size and high cell density is responsible for materials saving and enhanced properties. Microcellular foams usually have cell size of about 10 $\mu$m and cell density of $10^8$ cells/cm$^3$, and are stronger than conventional foams which have much bigger cells. It is thus desirable to discover ways to make foamed materials with even much smaller cells and much higher cell densities—materials with such characteristics are hereby termed as ultramicrocellular foams.

DESCRIPTION OF THE PRIOR ART

It is well known that a polymer gets plasticized as a gas dissolves in it, leading to a depression in the polymer's glass transition temperature $T_g$. The $T_g$-p profile, i.e. the relationship of the polymer's glass transition temperature $T_g$ and the gas pressure p at which the polymer is equilibrated with the gas, can be used to characterize the extent of plasticization. Depending on the polymer-gas interactions, the glass transition temperature of neat polymer, and the gas properties, the $T_g$-p profile may show substantially different patterns. For some polymer-gas systems, it follows a linear path within a limited pressure range as reported by Zhang and Handa, (1998).[1] For other polymer-gas systems, it exhibits a retrograde path, i.e. there exist two transitions under a constant gas pressure: a rubber-to-glass transition occurring at a lower temperature and a glass-to-rubber transition occurring at a higher temperature.

Retrograde vitrification was first observed experimentally by Wissinger and Paulaitis, (1991).[2] A generalized retrograde behavior was later on predicted theoretically by Condo et al., (1992)[3] and Kalospiros and Paulaitis, (1994).[4] These predictions indicate that the retrograde behavior should be expected for compressed gases that are effective plasticizers for the polymer of interest. $CO_2$ is a particularly desirable plasticizer since it is non-toxic, non-flammable, environmentally acceptable and is inexpensive. In practical terms, this behavior means that polymers may be plasticized with $CO_2$ under much milder conditions of pressure and temperature. The PMMA-$CO_2$ system was chosen for study because of the relatively high solubility of $CO_2$ in the polymer, leading to large $T_g$ depressions. The theoretical predictions were confirmed using creep compliance measurements to obtain $T_g$-p (Condo and Johnston, (1994)[5]. A stepwise heat-capacity method (Mraw and Naas (1979)[6] utilizing a high-pressure DSC (Zhang and Handa (1998)[1]) has been developed in our laboratory and described in the Examples which follow, to successfully measure the retrograde $T_g$-p profile.

In U.S. Pat. No. 5,684,055, issued on Nov. 4, 1997 to Kumar and Schirmer, a microcellular foam is formed by exposing a polymer sheet to a non-reacting gas at elevated pressure. The specific examples indicate operating pressures in the range of 700–800 psi, and there is no indication of cell size/density achieved. Furthermore, they were not foaming from the retrograde phase.

Also, in U.S. Pat. No. 5,133,913 which issued on Jul. 28, 1992 to Miyakawa et al., a process is disclosed which involves contacting supercritical $CO_2$ with molten polymer and, therefore, is a high temperature process.

In order to improve the mechanical properties of cellular foamed materials, a microcellular process was developed for manufacturing foamed plastics having greater cell densities and smaller cell sizes. See U.S. Pat. No. 4,473,665 issued on Sep. 25, 1984 to J. E. Martini-Vvedensky et al. The technique involves presaturating the plastics material(styrene) with a uniform concentration of a gas(nitrogen) under high pressure, followed by the sudden induction of thermodynamic instability to nucleate the cells. The dissolved gas acts as a blowing agent. In what follows, the term blowing agent refers to both the gas (or vapor) and liquid states of the blowing agent. Thus, the polymer is first saturated with the gas and then rapidly heated above the glass transition temperature to induce nucleation and foaming. The polymer is then quenched to maintain the microcellular structure. The foamed materials have average cell sizes in the range of 3 to 10 microns, and cell densities of about $10^9$ cells/cm$^3$. This process has also been used to produce microcellular foams from many different amorphous polymers, such as polyvinylchloride(PVC), polycarbonate, and ABS copolymer.

Also, in U.S. Pat. No. 5,160,674 issued on Nov. 3, 1992 to Colton and Suh, microcellular foams having cells in the range of 5 to 25 microns and a cell density of $10^{10}$ cells/cm$^3$ are formed from a semi-crystalline polymer e.g. polyethylene, polypropylene and co-polymers thereof, saturated with a gas e.g. air, noble gases, $N_2$ and $CO_2$, at high pressures within the range of 750–2500 psi.

The cell size and cell density of a foam are controlled by many factors, such as the solubility of gas in the polymer, the rate of pressure drop or temperature increase, and the surface tension of the polymer. A high gas solubility combined with a big pressure drop or a big temperature increase usually give foams with small cells and high cell density. The solubility of a gas in a polymer depends on the gas pressure and the system temperature. It increases with increasing pressure and decreases with increasing temperature. It follows that, for a given processing temperature, considerably high pressures will be required to produce foams with smaller cells and higher cell densities. For example, a $CO_2$ pressure higher than 205 atm at 50° C. (i.e. $CO_2$ in the supercritical state) is required for producing foams with cells less than 0.8 $\mu$m in size and cell density around $2 \times 10^{12}$ cells/g (U.S. Pat. No. 5,334,356 issued on Aug. 2, 1994 to Baldwin et al.).

High pressure processes are associated with several disadvantages such as equipment cost, sealing problems, and safety concerns. It is thus highly desirable to develop a low-pressure process to produce ultramicrocellular foams with very small size cells and very high cell density. Also, it would be beneficial to foam the materials at a relatively low temperature, such as room temperature, so that cell growth can be better controlled.

SUMMARY OF THE INVENTION

The present invention deals with a method for producing ultramicrocellular foams with very small size cells and very high cell density. Currently, such foams can be produced only by applying a gas pressure of 205 atm or higher. The present invention reduces the pressure requirement by over 80% without sacrificing the cellular characteristics. Furthermore, according to the present invention, the foaming process can be conducted at relatively low temperatures to provide better control on cell growth.

The present invention exploits the retrograde vitrification behavior observed in certain polymer-gas systems whereby two transitions—a rubber-to-glass transition and a glass-to-rubber transition—are observed at a constant gas pressure. The polymer can be processed either below the rubber-to-glass transition temperature or above the glass-to-rubber transition temperature. This invention pertains to processing the polymer below the rubber-to-glass transition temperature. The gas pressure at which such retrograde behavior occurs is lower than the critical pressure of the gas and might be lower than the saturation vapor pressure of the gas at room temperature. For example, with $CO_2$, the retrograde behavior processing pressure is typically observed in the pressure range of 20 to 40 atm and at temperatures below 32° C. For comparison, the critical pressure of $CO_2$ is 72.8 atm at the critical temperature of 31.2° C., and its saturation vapor pressure at room temperature is about 62 atm. Thus, when exposed to $CO_2$ at such low temperatures and pressures, a glassy polymer undergoes a transition to the rubbery state due to the rather high gas solubility. The equilibration times also become much faster due to the existence of the rubbery state.

On heating under ambient pressure, this rubbery polymer containing a high gas content gives foams with very small size cells and very high cell density. The foaming temperature can be selected anywhere from room temperature to a temperature below the glass transition temperature of the neat polymer.

The polymer to be foamed can be in any desired geometrical shape e.g. a preformed sheet or formed into a sheet by conventional molding techniques. Typically, saturation time will depend upon the polymer-blowing agent combination used and the geometrical characteristics of the polymer. More specifically, there is a finite time which is required for the polymer to become saturated with the blowing agent, which will vary depending upon the surface area to volume ratio of the polymer.

According to the invention, a method is provided for producing a closed cell polymer foam having a cell size in the microcellular to ultramicrocellular size range and substantially uniform cell density, comprising (a) selecting a suitable solid polymer and inert blowing agent combination, wherein the blowing agent is in the form of a gas or a volatile liquid which induces retrograde vitrification of the polymer, (b) determining the retrograde vitrification profile of the glass transition temperature $(T_g)$ of the polymer versus gas pressure, and the saturation vapor temperature versus pressure curve of the blowing agent, wherein the $T_g$ versus gas pressure profile of the polymer and the saturation vapor temperature versus pressure curve of the blowing agent, both have a positive slope portion, (c) when the blowing agent is in the form of a gas, pressurizing the gas and exposing the polymer to the pressurized gas for a time sufficient to establish a saturated polymer-gas solution, while maintaining a processing pressure and temperature within a window defined by the area between the positive slope portions of the retrograde vitrification profile of the $T_g$ of the polymer versus pressure and the saturation vapor temperature versus pressure curve of the gas, or (c) when the blowing agent is in the form of a volatile liquid, contacting the polymer with the volatile liquid for a sufficient time to establish a saturated polymer-blowing agent solution, while maintaining a processing pressure and temperature below the saturation vapor temperature versus pressure curve of the blowing agent, wherein the polymer is in a rubbery state, (d) quickly transferring the saturated polymer to an environment at ambient pressure and a temperature from the temperature at which the polymer is saturated with the blowing agent up to the $T_g$ of the neat polymer, in the presence of a heat transfer medium, to form the foam, and (e) quenching the foamed polymer by rapidly cooling to a lower temperature.

DESCRIPTION OF THE PREFERRED EMBODIMENTS

Figure 1:
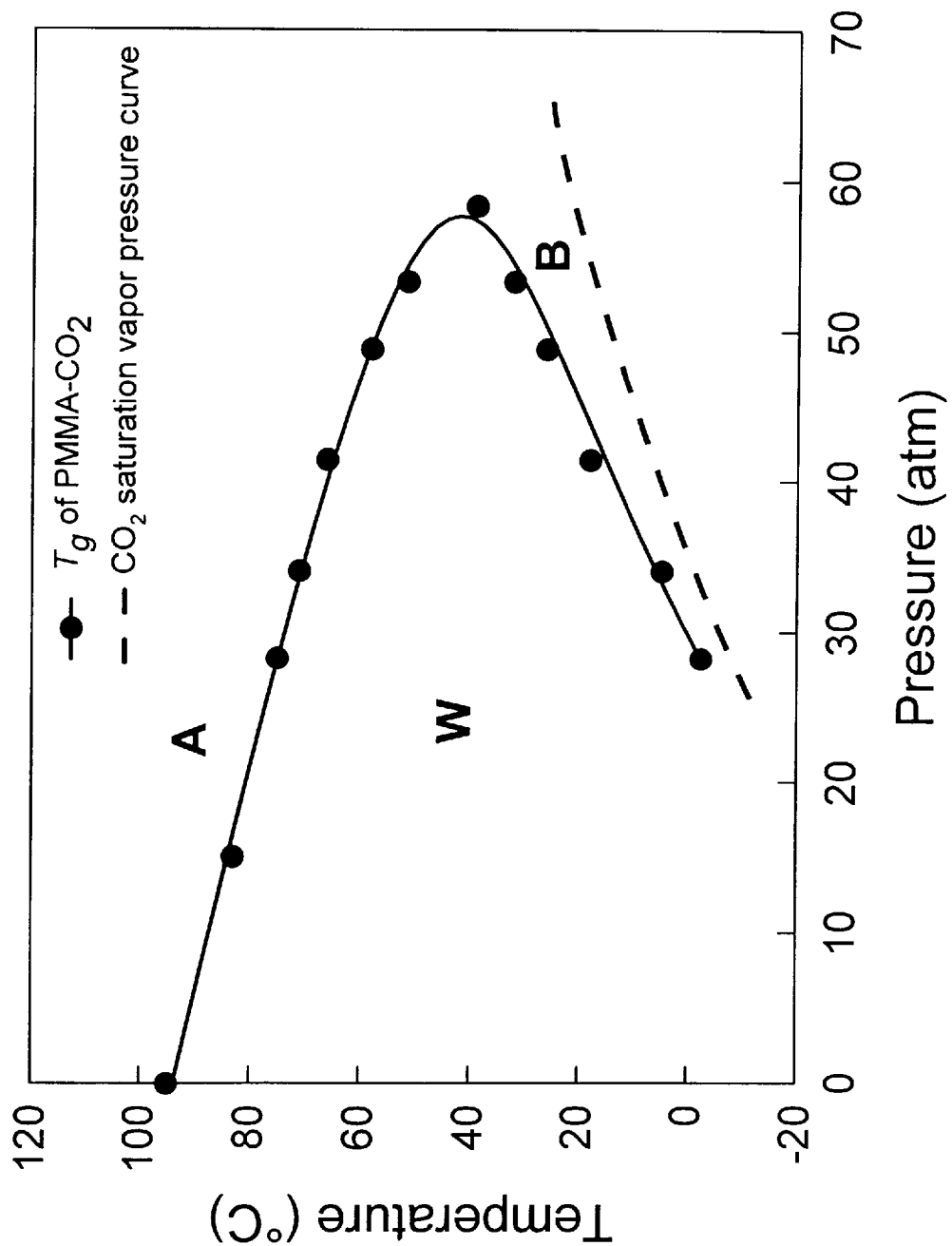
FIGS. 1 and 2 respectively show the retrograde vitrification profile of the glass transition temperature of poly (methyl methacrylate) (PMMA)-$CO_2$ and poly(ethyl methacrylate) (PEMA)-$CO_2$ systems, as a function of $CO_2$ pressure, and the saturation vapor temperature versus pressure curve of $CO_2$.
Figure 2:
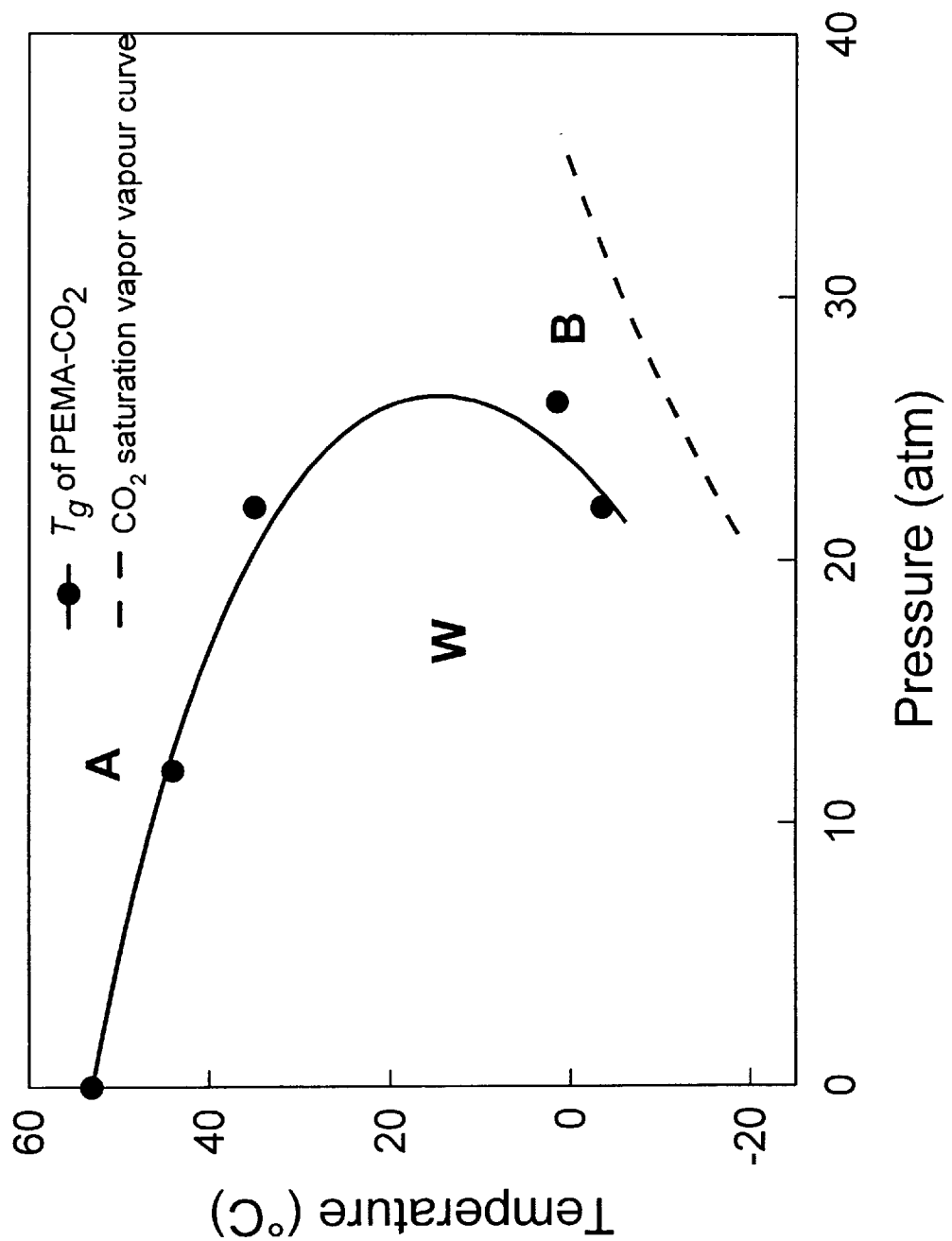

FIG. 1 and FIG. 2 show the retrograde vitrification profile of the glass transition temperature $(T_g)$ for two polymer-blowing agent systems, PMMA-$CO_2$ and PEMA-$CO_2$, respectively, measured by the high-pressure DSC as described above. Also shown in the figures is the saturation vapor pressure curve of $CO_2$ where $CO_2$ is in the vapor state above the curve and in the liquid state below the curve. The polymers are in glassy state within the area, indicated as W, of the profile, but in rubbery state outside the profile, in the areas indicated as A and B. Note that the polymers are in the rubbery state below the $CO_2$ saturation curve as well. Accordingly, when the blowing agent is in the form of a gas, the gas is pressurized and the polymer is exposed to the pressurized gas for a time sufficient to establish a saturated polymer-gas solution, while maintaining the processing pressure and temperature within a window defined by the area between the positive slope portions of the retrograde vitrification profile of the $T_g$ of the polymer versus pressure and the saturation vapor temperature versus pressure curve of the gas. When the blowing agent is in the form of a volatile liquid, the polymer is contacted with the volatile liquid for a time sufficient to establish a saturated polymer-blowing agent solution, while maintaining the processing pressure and temperature within the area below the saturation vapor temperature versus pressure curve of the blowing agent.

Figure 3:
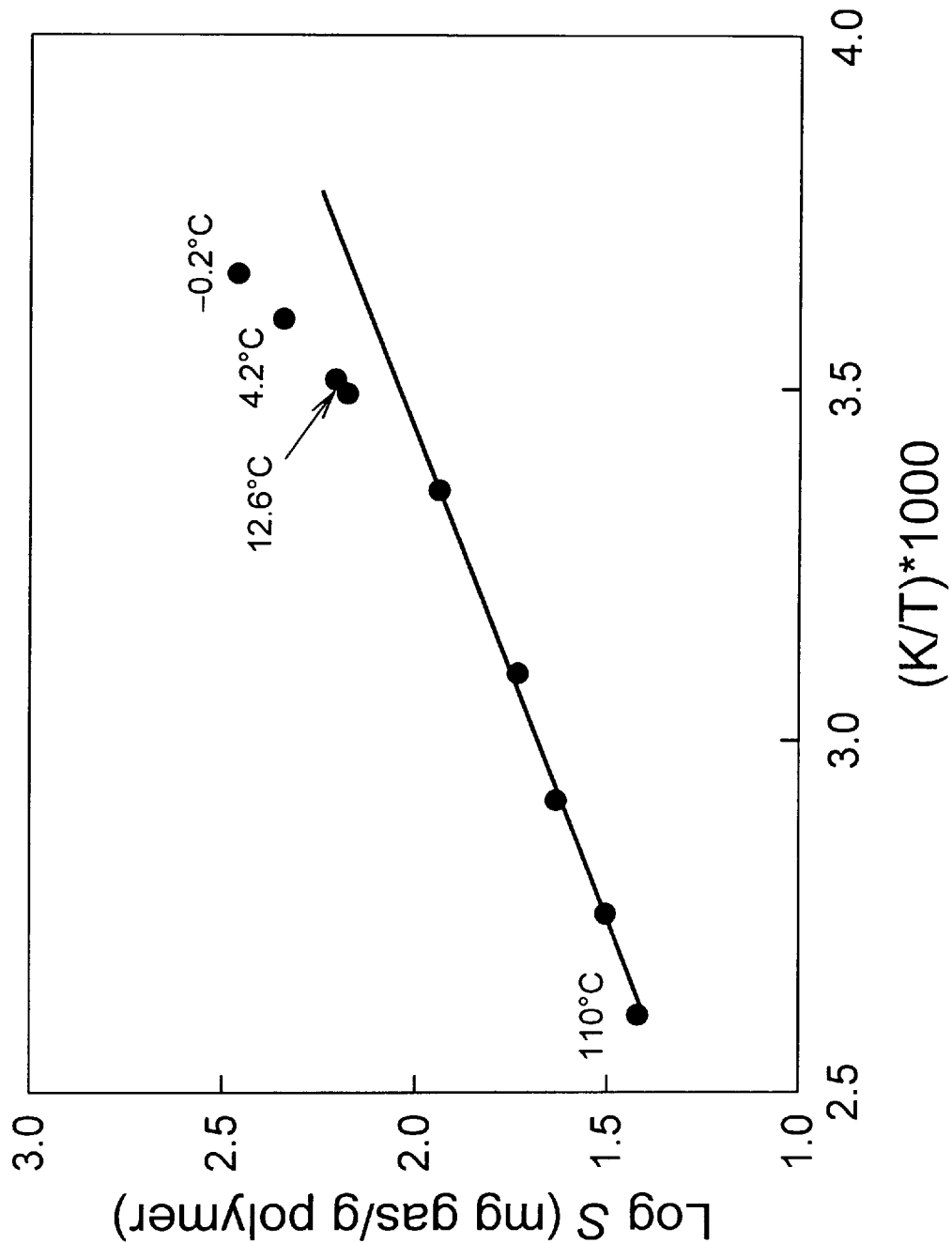
FIG. 3 is the Arrhenius plot of $CO_2$ solubility in PMMA at 34 atm and various temperatures.
Figure 4:
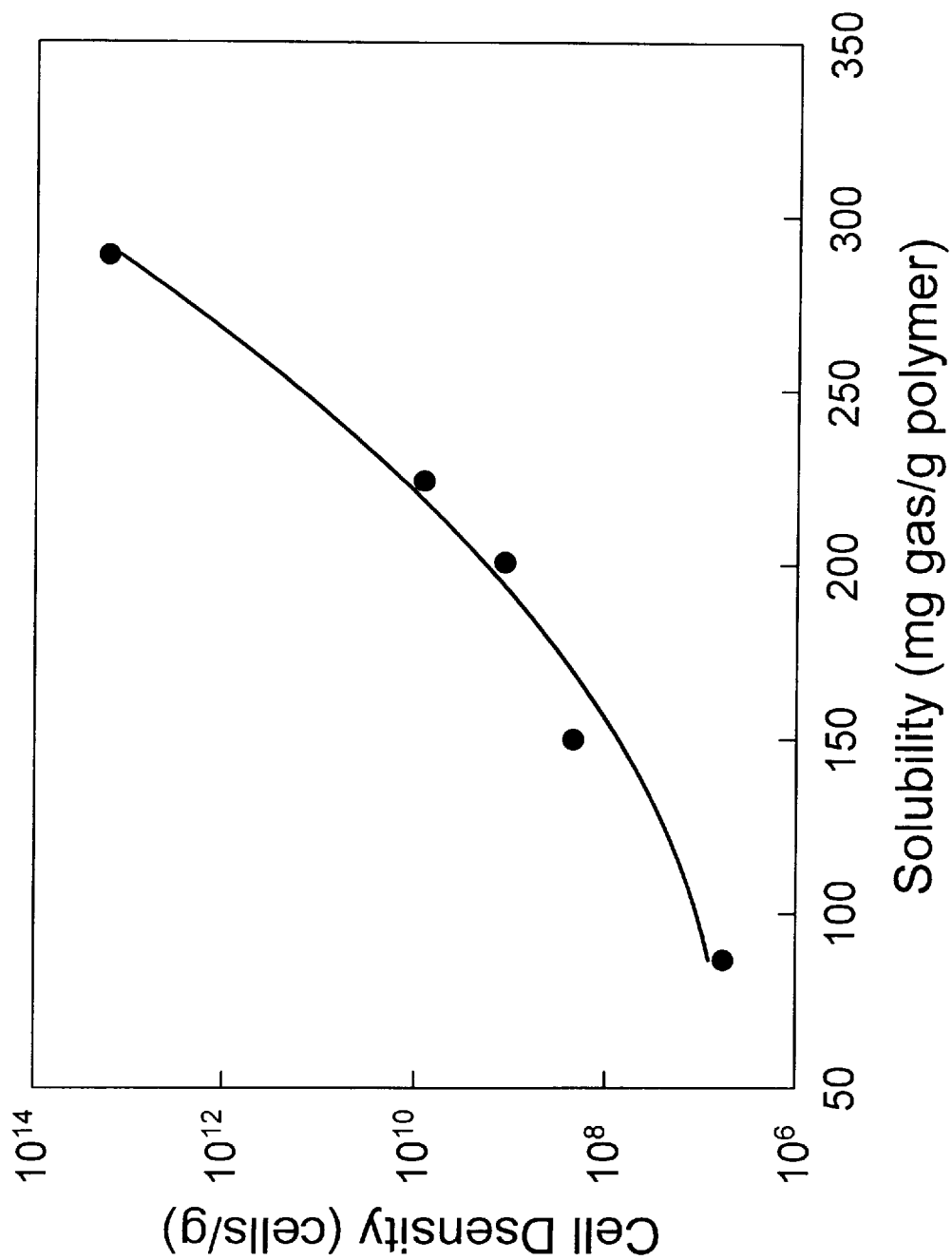
FIGS. 4 and 5 show the cell size and cell density, respectively, of PMMA foams as a function of $CO_2$ solubility in the polymer.
Figure 5:
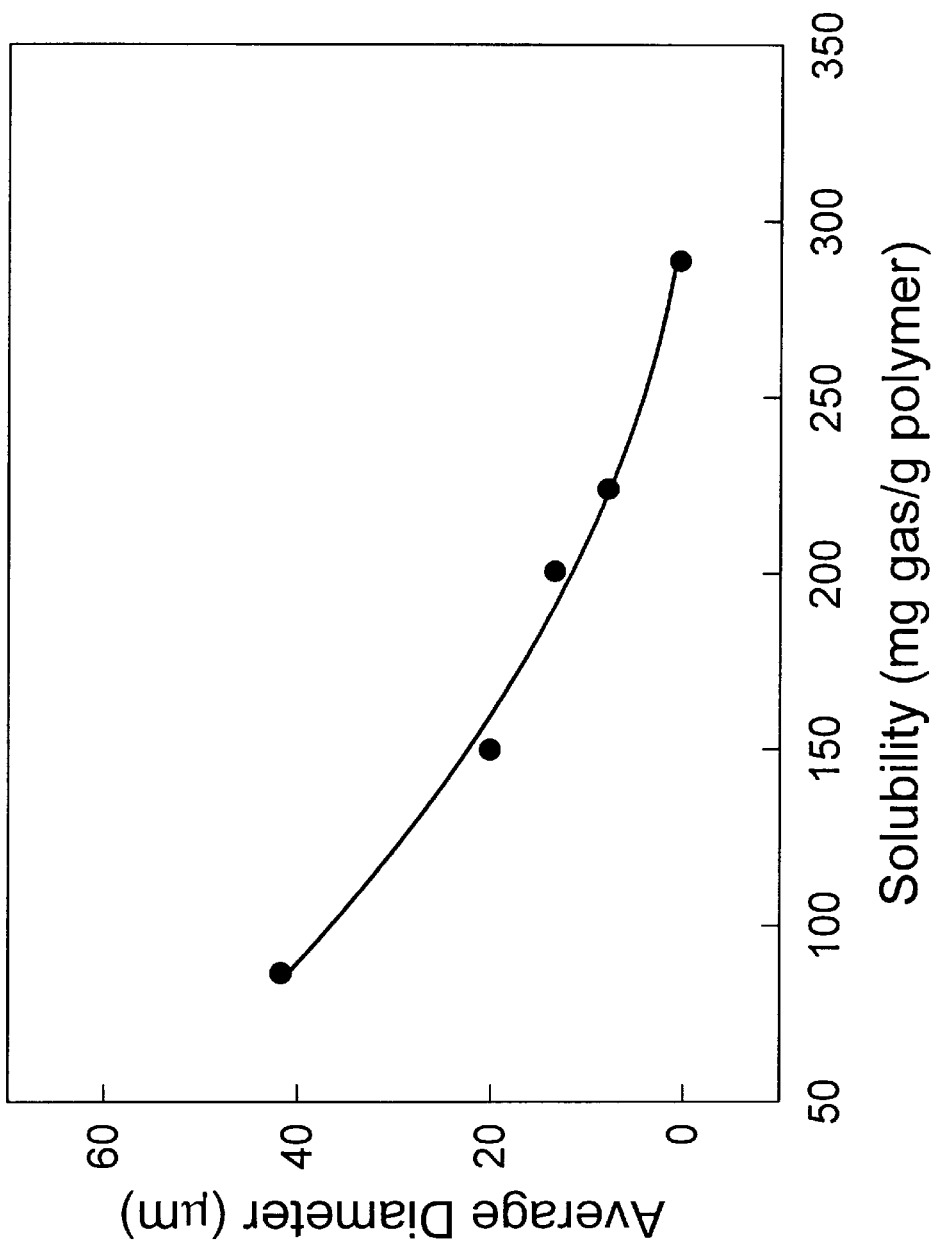

At a given pressure, gas solubility in a glassy polymer increases as the temperature is decreased. In certain polymer-blowing agent systems, the solubility of the blowing agent(in its vapor or liquid state) at low temperatures can reach very high levels leading to severe plasticization and, thereby, forcing the polymer into the rubbery state, and thus producing the retrograde effect as shown in FIG. 1 and FIG. 2. Specifically, the retrograde vitrification profile of the Tg of the polymer versus pressure includes a positive slope portion, illustrating the increase in gas solubility in the polymer at lower temperatures. FIG. 3 shows the Arrhenius plot of the solubility of 34 atm $CO_2$ in PMMA within a temperature range of $-0.2$ to $110°$ C. The data in the range from $-0.2°$ C. to about $12°$ C. deviate from the linear plot that otherwise fits the majority of the data. The deviation is significant considering it is a semi-logarthimic plot. This exceptionally high gas solubility leads to a substantial depression in the glass transition temperature, producing a rubbery state at such low temperatures. FIGS. 4 and 5 show the structural characteristics of PMMA foams blown by $CO_2$ as a function of $CO_2$ solubility in the polymer. Obviously, a high solubility is necessary for foaming the materials with small cells and high cell density.

This invention is based on achieving a high gas solubility at a low pressure and at temperatures below the positive slope portion of the retrograde vitrification profile of the $T_g$ of the polymer versus pressure curve at which temperatures the blowing agent may be in the gas or liquid state. For example, at $-0.2°$ C. under 34 atm, a solubility value of 288.8 mg $CO_2$ per gram PMMA was obtained when the polymer was contacted with $CO_2$ vapors and a solubility value of 297.5 mg $CO_2$ per gram PMMA was obtained when the polymer was contacted with liquid $CO_2$. On the other hand, above $35°$ C. where $CO_2$ is in the supercritical fluid state, a pressure higher than 200 atm is required to obtain a comparable solubility of $CO_2$ in PMMA (Goel and Beckman, (1994)[7].

Figure 6:
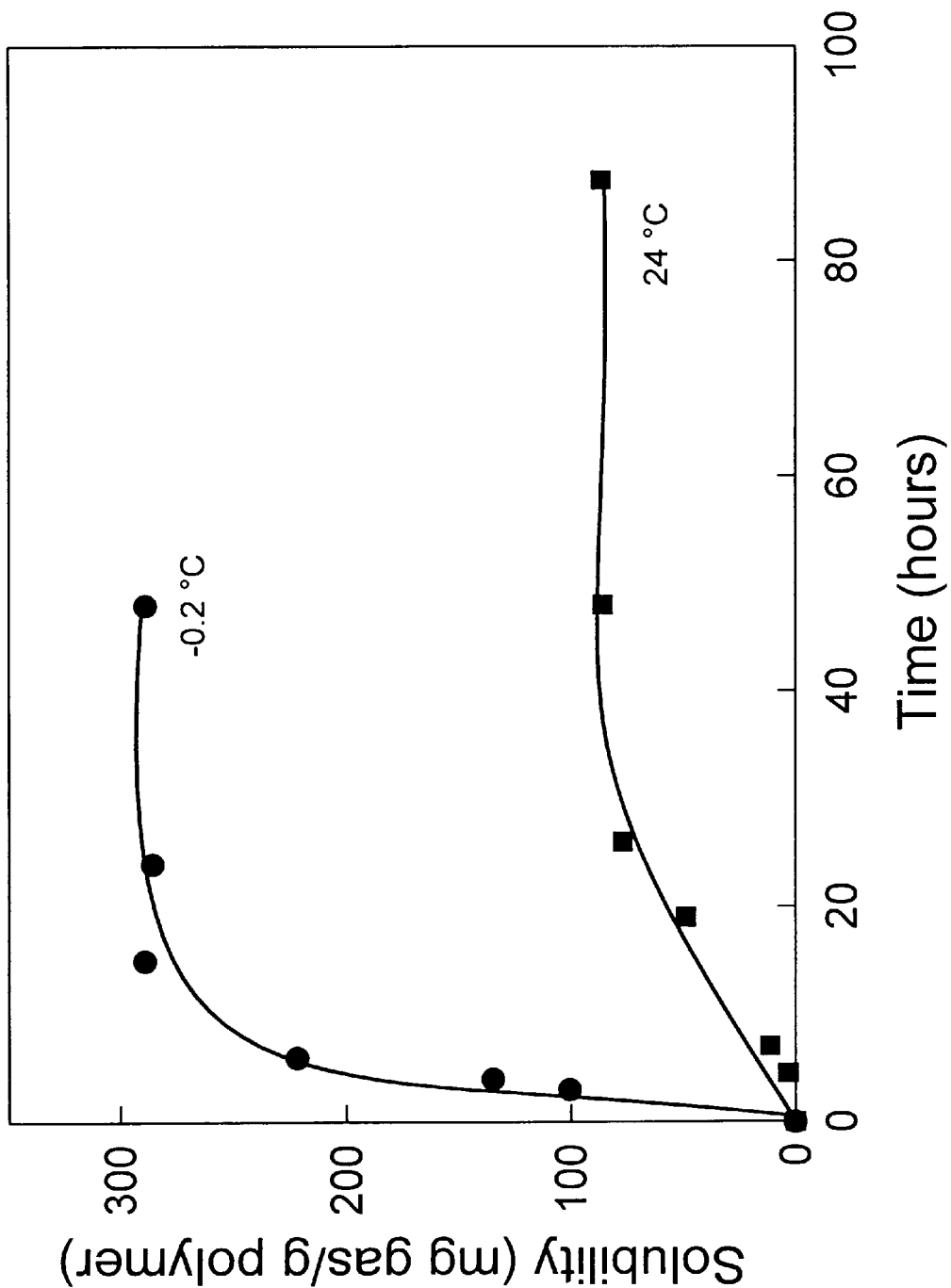
FIG. 6 is the sorption kinetics of 34 atm $CO_2$ in 1.25 mm thick PMMA at −0.2° C. and 24° C.

The diffusion of a gas in a rubbery polymer is much faster than when the polymer is in the glassy state, and the diffusion coefficient generally decreases with decrease in temperature. It is very important that the gas sorption under the processing conditions be quite fast in spite of the fact that our method uses low temperature processing. As shown in FIG. 6, the sorption of $CO_2$ in 1.25 mm thick PMMA sheet is even faster at $-0.2°$ C. than at $24°$ C. under a constant pressure of 34 atm. The reason is that, as seen in FIG. 1, the polymer is plasticized into the rubbery state at $-0.2°$ C. where the diffusion of $CO_2$ is quite fast whereas at $24°$ C. the polymer is in the glassy state where the diffusion of $CO_2$ is much reduced. Therefore, the advantage of our method is that not only very high gas solubility is achieved but also the polymer-gas solubility equilibrium is established within a short time.

According to the invention, the $T_g$-p profile of a polymer-gas system is first established to determine the processing window which is located below the positive slope portion of the profile. Within this window, the polymer is exposed to the gas or condensed liquid for a certain period until solubility equilibrium is attained. It is then transferred into an ambient pressure environment at a foaming temperature in the range from the temperature at which it was saturated with the blowing agent up to the $T_g$ of the neat polymer, in the presence of a heat transfer medium. Air, water, and other media are acceptable for the heat transfer process. When the desired cell size is reached, typically in 1 to 2 minutes, the foams can be quenched into cold water to stop further cell growth.

Figure 7:
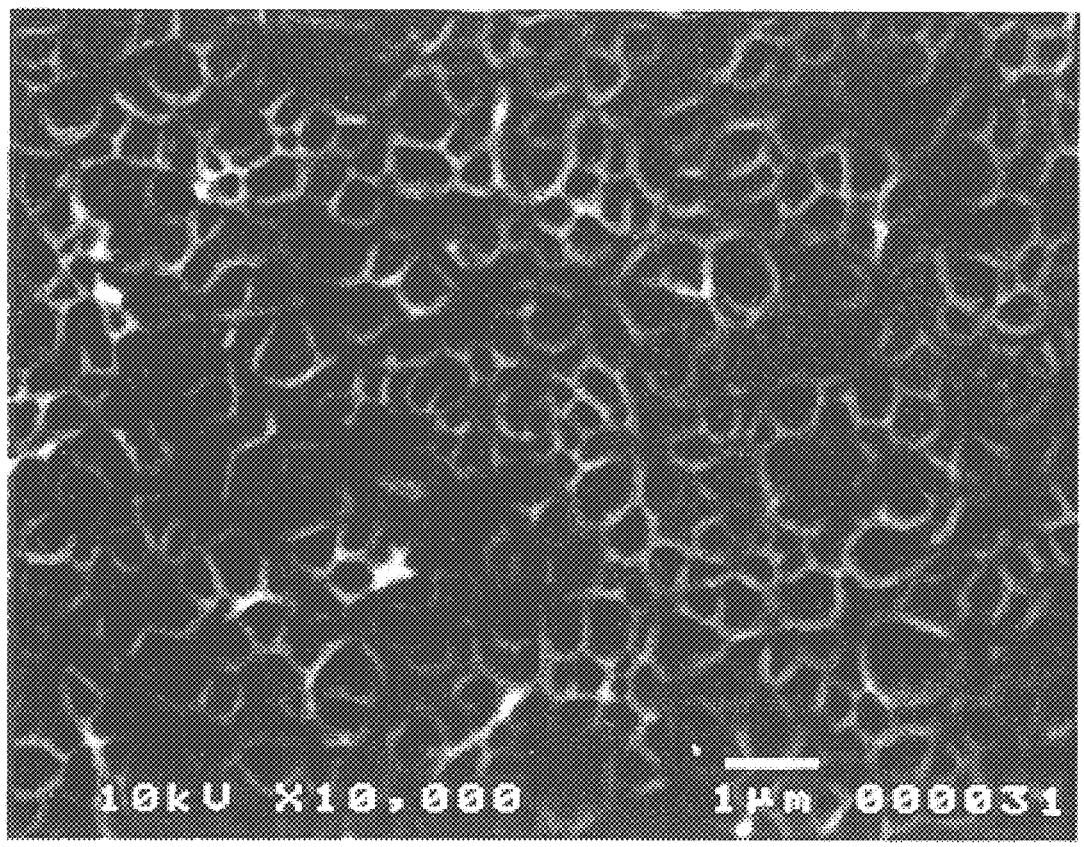
FIG. 7 is a representative scanning electron microscope (SEM) microphotograph of PMMA foam after the polymer was saturated with 34 atm $CO_2$ at −0.2° C. and foamed at 60° C.

FIG. 7 shows a typical SEM microphotograph of PMMA foam produced by saturating the polymer with 34 atm $CO_2$ at $-0.2°$ C. and foamed at $60°$ C. for 2 minutes. The average cell size, cell density and foam density were determined to be 0.35 $\mu$m, $4\times10^{13}$ cells/g, and 0.12 g/cm$^3$, respectively. Such small cells and high cell density, however, are difficult to achieve, even at a pressure above 200 atm, by other processes as reported in the open and patent literature. For example, when PMMA was saturated at $50°$ C. and 345 atm, foams with cell size of 0.83 $\mu$m and cell density of $3.1\times10^{11}$ cells/g were produced by Goel and Beckman, (1994)[8].

EXAMPLE 1

The $T_g$-p profile of PMMA-$CO_2$ as shown in FIG. 1 was measured using high-pressure DSC (Setaram 121) by using stepwise heat-capacity method. The set up and operation of the DSC technique can be found in the publication by Zhang and Handa, (1998)[1], the disclosure of which is incorporated herein by reference. The method includes: measuring the heat capacities of the polymer-gas system under a certain, constant gas pressure and at various temperatures by the stepwise technique to give the glass transition temperature of the polymer containing dissolved gas; carrying out these experiments at different pressures, and thus building up the $T_g$-p profile. The processing window is then given by the pressure-temperature within the area between the positive slope portion of the retrograde vitrification profile of the $T_g$ of the polymer versus pressure and the gas saturation vapour pressure curve.

Figure 8:
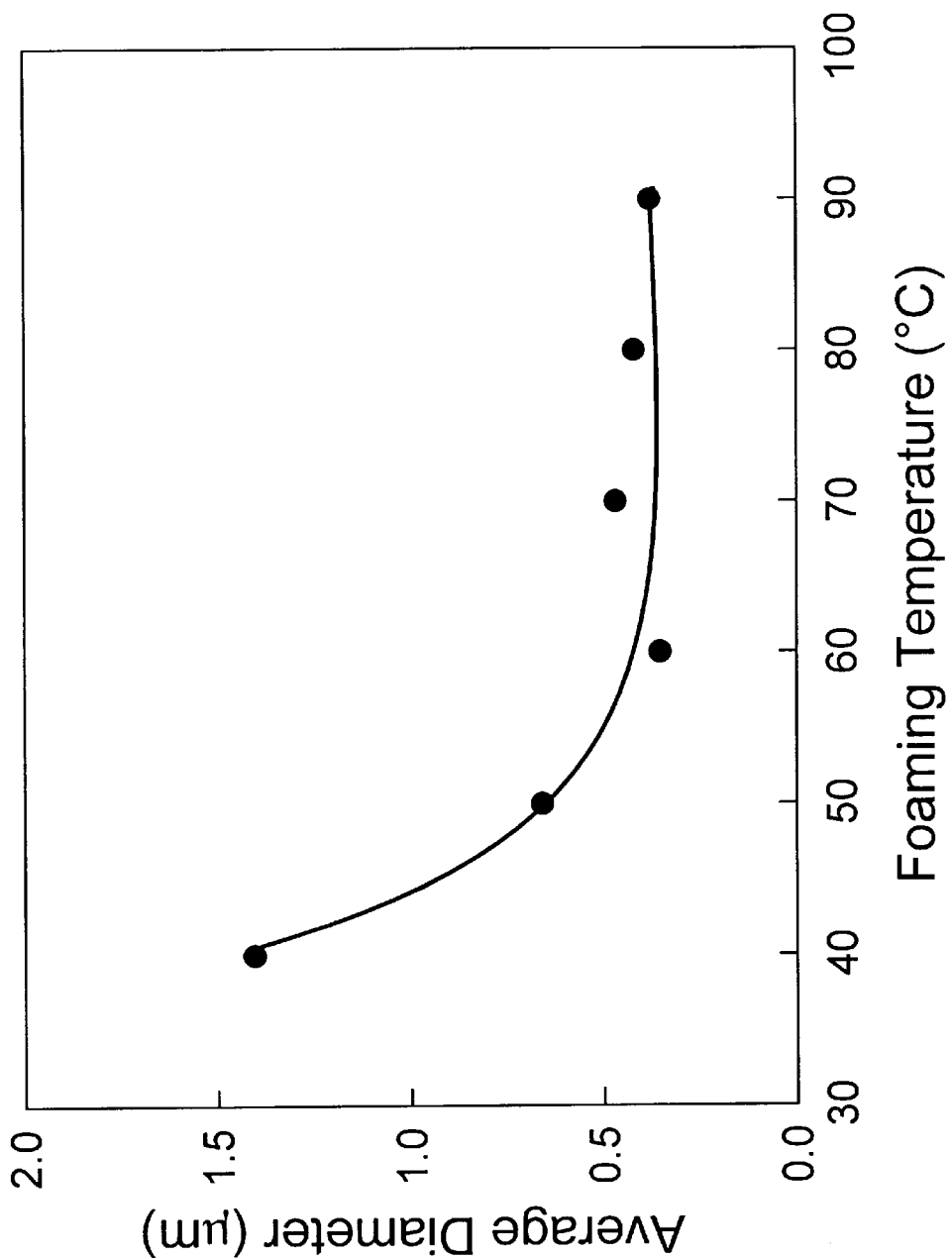
FIGS. 8, 9 and 10 show the cell size, cell density and foam density, respectively, of PMMA foams as a function of foaming temperature after the polymer was saturated with 34 atm $CO_2$ at −0.2° C.
Figure 9:
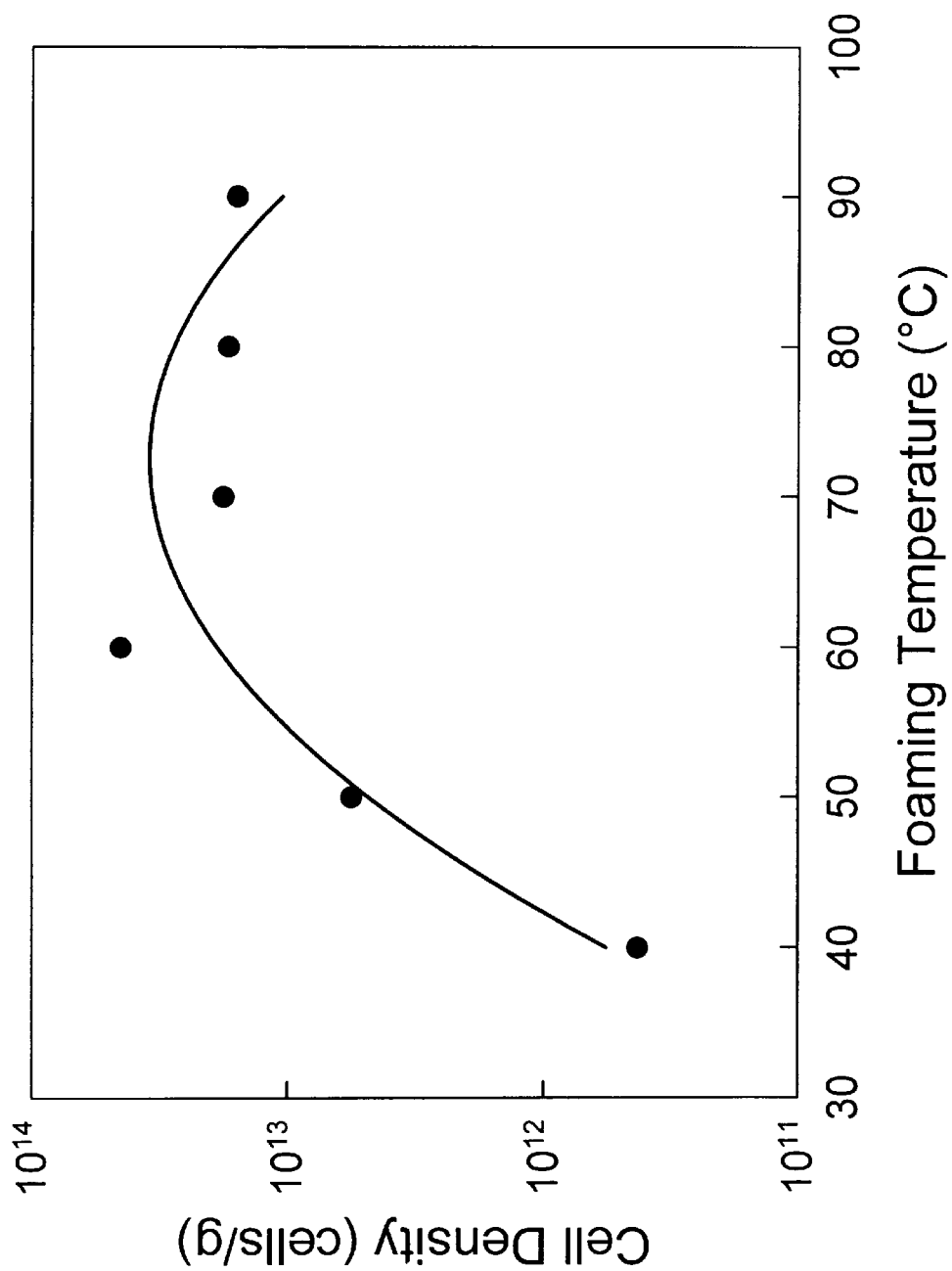
Figure 10:
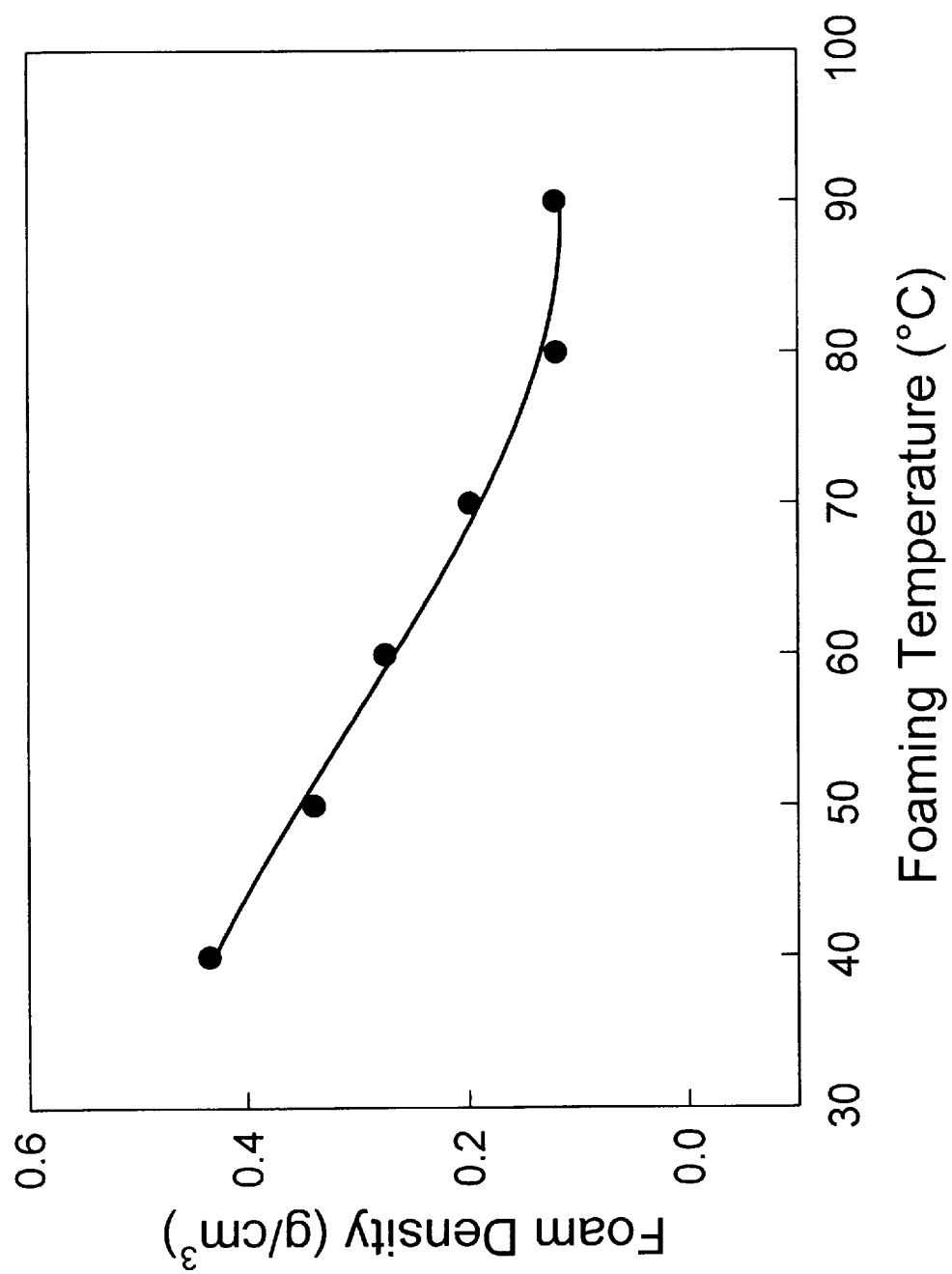

PMMA obtained from Canus Plastics was compression molded into 1.25 mm thick sheets, placed in a pressure vessel made up of stainless steel VCR fittings, and exposed to $CO_2$ under 34 atm at $-0.2°$ C. for 24 hours. Under these conditions, the solubility of $CO_2$ vapors was measured to be 288.8 mg $CO_2$/g polymer and of $CO_2$ liquid was measured to be 297.5 mg $CO_2$/g polymer. After the pressure was released to ambient, the polymer sheets containing $CO_2$ were removed from the vessel and transferred into a hot water bath kept at various temperatures. The polymer was allowed to foam for 2 minutes followed by quenching into cold water. FIG. 7 shows a typical SEM microphotograph of the PMMA foams obtained at $60°$ C. The foam characteristics were the same regardless of whether the polymer was contacted with $CO_2$ in the vapor or liquid state. This is due to the fact that, for the present polymer-gas system, the two saturation processes lead to almost the same solubility. FIGS. 8, 9, and 10 show the cell size, cell density, and foam density, respectively, of the PMMA foams as a function of foaming temperature. The cell density, here, is expressed as the ratio of the number of cells in unit volume of foam to the foam density. The advantage of calculating the cell density this way over the techniques reported in literature is that no assumption regarding the cell geometry is involved.

The exceptionally high gas solubility in the polymer provides the necessary condition for producing foams with small size cells and high cell density, while an appropriate foaming temperature, FIGS. 8, 9, and 10, can be selected to further optimise these properties. As seen from the results, ultramicrocellular foams can be obtained within a wide range of foaming temperatures.

The optimum foaming temperature for PMMA is about $60°$ C. A useful temperature range would be from the temperature at which the polymer is saturated with the blowing agent up to the Tg of the neat polymer ie. about 100° C. for PMMA. For a given polymer, the optimum temperature and foaming time is usually established by generating curves as those shown in FIGS. 8–10.

EXAMPLE 2

PMMA sheets, 2.72 mm thick, obtained from Canus Plastics were placed in a pressure vessel made up of stainless steel VCR fittings and exposed to $CO_2$ under 40 atm at 2.4° C. for 24 hours. They were then placed in water at 80° C. under ambient pressure for 1 minute for foaming. The average cell size and cell density of the foams obtained were 0.72 $\mu$m and $1.1 \times 10^{12}$ cells/g respectively.

EXAMPLE 3

The low-pressure saturation process could also be used to produce regular microcellular foams with bigger cell size and lower cell density. PMMA sheets, 2.72 mm thick, obtained from Canus Plastics, were exposed to $CO_2$ under 34 atm at −0.2° C. for 24 hours, then foamed at 24° C. and ambient pressure for 2 minutes. The average cell size and cell density of the foams were 4.8 $\mu$m and $4 \times 10^9$ cells/g, respectively. When the saturation conditions were 49 atm $CO_2$ at 10° C. for 24 hours (the actual time for saturation may be much less than 24 h; however, we customarily allotted 24 h to ensure saturation) and the sample foamed at 60° C. at ambient pressure for 2 minutes, the average cell size was 9.2 $\mu$m and the cell density was $2.1 \times 10^9$ cells/g.

EXAMPLE 4

Figure 11:
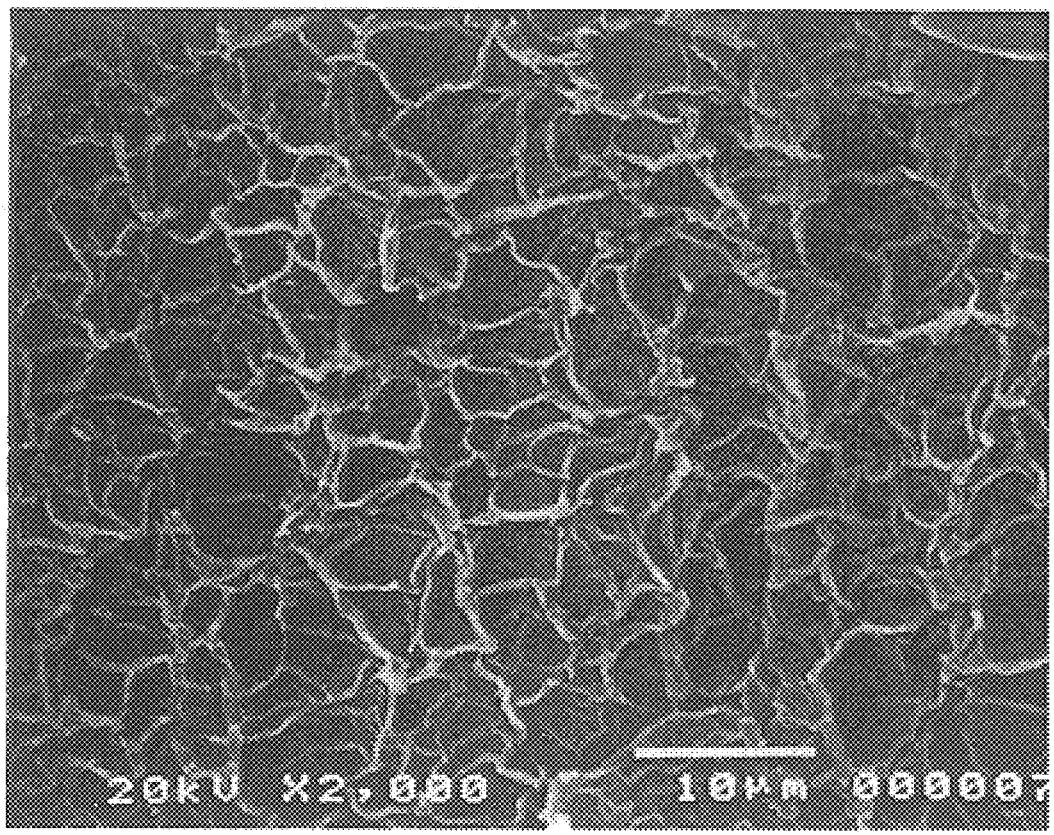
FIG. 11 is a representative SEM microphotograph of PEMA foam after the polymer was saturated with 24 atm $CO_2$ at −7° C. and foamed at 24° C.

The $T_g$-p profile for PEMA-$CO_2$ as shown in FIG. 2 was measured as in Example 1, using the high-pressure DSC (Setaram 121) by the stepwise heat-capacity technique. A processing window was determined as the pressure-temperature conditions in the area between the positive slope portion of the profile, and the gas saturation vapor pressure curve. PEMA from Aldrich was compression moulded into 1.22 mm thick sheets and exposed to 24 atm $CO_2$ at −7° C. for 24 hr. They were then removed from $CO_2$ and foamed at room temperature and ambient pressure for 1 minute. FIG. 11 shows a typical SEM microphotograph of the PEMA foam. The average cell size and cell density were 1.9 $\mu$m and $5.2 \times 10^{11}$ cells/g, respectively.

Although the invention has been described in terms of specific polymer-gas systems, it will be appreciated by those skilled in the art that it is applicable to any polymer-blowing agent system exhibiting the $T_g$-p behavior such as is shown in FIG. 1 and FIG. 2. In other words, polymer-blowing agent systems in which a retrograde vitrification of the $T_g$ of the polymer occurs as a result of dissolution of the blowing agent in the polymer, at temperature and pressure conditions below the positive slope portion of the retrograde vitrification profile of the $T_g$ of the polymer versus pressure.

Moreover, any amorphous and semi-crystalline thermoplastic polymer can be used. Examples include, polystyrene, PVC, polycarbonate, ABS copolymers, and polyethyleneterephthalate(PET) and others which have been described in the literature.

For the blowing agent, any inert compound which does not react with the polymer and which induces retrograde vitrification of the polymer may be used e.g $CO_2$, ethylene and ethane.

Moreover, although a batch process is described in the Examples, it will be appreciated that a continuous process can be achieved e.g. by providing the polymer sheet in the form of a roll. Other changes and modifications of this nature can also be carried out without departing from the scope of the invention which is intended to be limited only by the scope of the appended claims.

REFERENCES CITED (Disclosures of which are incorporated herein by reference)

1. Zhang and Handa, Journal of polymer Science: Part B: Polymer Physics, 36 (1998), 977–982.
2. Wissinger and Paulaitis, Journal of Polymer Science: Part B: Polymer Physics, 29 (1991) 631–633.
3. Condo et al., Macromolecules, 25 (1992) 6119–6127.
4. Kalospiros and Paulaitis, Chemical Engineering Science, 49 (1994), 659–668.
5. Condo and Johnston, Journal of Polymer Science: Part B: Polymer Physics, vol. 32, 523–533(1994).
6. Mraw and Naas, Journal of Chemical Thermodynamics, 11 (1979), 567–584.
7. Goel and Beckman, Polymer Engineering and Science, 34 (1994), 1137–1147.
8. Goel and Beckman, Polymer Engineering and Science, 34 (1994), 1148–1156.

We claim:

1. A method for producing closed cell polymer foams in the microcellular to ultramicrocellular range, comprising
   (a) selecting a suitable solid polymer and inert blowing agent combination, wherein the blowing agent is in the form of a gas or a volatile liquid which induces retrograde vitrification in the polymer,
   (b) determining the retrograde vitrification profile of the glass transition temperature($T_g$) of the polymer versus gas pressure, and the saturation vapor temperature versus pressure curve of the blowing agent, wherein the Tg versus gas pressure profile of the polymer and the saturation vapor temperature versus pressure curve of the blowing agent both have a positive slope portion,
   (c) exposing the polymer to the blowing agent in the gas or liquid state for a time sufficient to establish a saturated polymer-blowing agent solution, while maintaining a processing pressure and temperature below the positive slope portion of the retrograde vitrification profile, and wherein the polymer is in a rubbery state,
   (d) quickly transferring the saturated polymer to an environment at ambient pressure and a temperature from the processing temperature up to the Tg of the neat polymer in the presence of a heat transfer medium, to form the foam, and
   (e) quenching the foamed polymer by rapidly cooling to a lower temperature.

2. A method according to claim 1, wherein the blowing agent is in the form of a gas, and wherein step (c) involves pressurizing the gas and exposing the polymer to the pressurized gas for a time sufficient to establish a saturated polymer-gas solution, while maintaining the processing pressure and temperature within a window defined by the area between the positive slope portions of the retrograde vitrification profile of the $T_g$ of the polymer versus pressure and the saturation vapor temperature versus pressure curve of the gas.

3. A method according to claim 1, wherein the blowing agent is in the form of a volatile liquid and wherein step (c) involves contacting the polymer with the volatile liquid for a time sufficient to establish a saturated polymer-blowing agent solution, while maintaining the processing pressure and temperature below the saturation vapor temperature versus pressure curve of the blowing agent.

4. A method according to claim 1, wherein step (c), the processing pressure is below the critical pressure of the blowing agent.

5. A method according to claim 4, wherein step (c), the processing temperature is below the critical temperature of the blowing agent.

6. A method according to claim 5, wherein the polymer is selected from the group consisting of thermoplastic amorphous polymers and thermoplastic semi-crystalline polymers.

7. A method according to claim 6, wherein the blowing agent is selected from the group consisting of $CO_2$, ethylene and ethane.

8. A method according to claim 7, wherein the blowing agent is $CO_2$.

9. A method according to claim 8, wherein step (c) the processing pressure is in the range of 20–40 atmospheres, and the temperature is less than 32° C.

10. A method according to claim 9, wherein the polymer is PMMA.

11. A method according to claim 10, wherein step (c), the processing pressure is in the range of 34 to 40 atmospheres, and the temperature is in the range of −0.2 to 2.4° C., for about 24 hours, and wherein step (d) the foaming temperature is in the range of 60 to 80° C. for 1 to 2 minutes.

12. A method according to claim 9, wherein the polymer is PEMA.

13. A method according to claim 12, wherein step (c) the processing pressure is about 24 atmospheres and the temperature is about −7° C., and wherein step (d) the foaming temperature is about room temperature for about 1 minute.

14. A method according to claim 9, wherein step (d), the heat transfer medium is selected from air and water.

15. A method according to claim 14, wherein the foams are ultramicrocellular foams having an average cell size of up to 0.5 $\mu$m and a cell density of equal to or greater than $10^{12}$ cells/g.

16. A method according to claim 14, wherein the foams are microcellular foams having average cell sizes of up to 10 $\mu$m and a cell density equal to or greater than $10^9$ cells/g.

17. A method according to claim 2, wherein the polymer is selected from the group consisting of thermoplastic amorphous and thermoplastic semi-crystalline polymers, and wherein the blowing agent is selected from the group consisting of $CO_2$, ethylene and ethane.

18. A method according to claim 17, wherein the foams are ultramicrocellular foams having an average cell size of up to 0.5 $\mu$m and a cell density of equal to or greater than $10^{12}$ cells/cm$^3$.

19. A method according to claim 3, wherein the polymer is selected from the group consisting of thermoplastic amorphous and thermoplastic semi-crystalline polymers, and wherein the blowing agent is selected from the group consisting of $CO_2$, ethylene and ethane.

20. A method according to claim 19, wherein the foams are ultramicrocellular foams having an average cell size of up to 0.5 $\mu$m and a cell density of equal to or greater than $10^{12}$ cells/g.

* * * * *